United States Patent [19]

Hayashida

[11] Patent Number: 4,475,509
[45] Date of Patent: Oct. 9, 1984

[54] INDUCTION SYSTEM OF FOUR STROKE INTERNAL COMBUSTION ENGINE

[75] Inventor: Takanori Hayashida, Iwata, Japan

[73] Assignee: Yamaha Hatsudoki Kabushiki Kaisha, Japan

[21] Appl. No.: 329,521

[22] Filed: Dec. 10, 1981

Related U.S. Application Data

[63] Continuation of Ser. No. 964,156, Nov. 28, 1978, abandoned.

[30] Foreign Application Priority Data

Nov. 30, 1977 [JP] Japan .................................. 52-142671

[51] Int. Cl.³ ........................ F02M 13/07; F02B 17/00
[52] U.S. Cl. ..................................... 123/432; 123/308
[58] Field of Search ..................... 123/52 M, 547, 548, 123/557, 308, 432, 442; 261/23 A, 65 R, 39 A

[56] References Cited

U.S. PATENT DOCUMENTS 2,028,585  1/1936  Blake ................................... 123/432
4,186,706  2/1980  Matsumoto ......................... 123/432
4,194,474  3/1980  Endo ................................... 123/432

FOREIGN PATENT DOCUMENTS 1153559  4/1966  United Kingdom ............. 123/52 M

Primary Examiner—Ronald H. Lazarus
Attorney, Agent, or Firm—Ernest A. Beutler

[57] ABSTRACT

An induction system for an internal combustion engine having main induction passages and relatively small cross-sectional area auxiliary induction passages for delivering a charge from a carburetor to the combustion chambers. A control valve arrangement is provided so that the engine charge requirement at idle and low load are supplied through the small auxiliary induction passages so as to increase turbulence in the combustion chamber at the time of combustion. The inlet to the auxiliary induction passage is disposed in the path of fuel discharge from the idle circuit of the associate carburetor so as to improve mixture distribution and promote smooth running. The inlet for the auxiliary induction passage is also positioned at a higher point than the control valve so as to reduce the likelihood of liquid fuel being drawn into the auxiliary induction system. The inlet for the auxiliary system is also heated to improve vaporization.

17 Claims, 2 Drawing Figures

INDUCTION SYSTEM OF FOUR STROKE INTERNAL COMBUSTION ENGINE

BACKGROUND OF THE INVENTION

This is a continuation of application Ser. No. 964,156, filed Nov. 28, 1978, now abandoned.

This invention relates to an induction system for an internal combustion engine and more particularly to an induction system that provides improved economy and smooth running under idle and low load conditions.

It has been recently discovered that low speed efficiency of an internal combustion engine may be significantly improved through the use of a relatively small cross-sectional area auxiliary induction system which delivers substantially all of the charge requirements to the engine chambers under this running condition. Several arrangements for achieving this result and the advantages thereof are disclosed in the co-pending application of Hiromatsu Matsumoto entitled Control of Carburetor Supplied Induction System, Ser. No. 838,353, filed Sept. 30, 1977. Basically, the use of such an induction system increases the turbulence in the combustion chamber at the time of ignition. Thus, flame provocation is speeded up and smooth running, good fuel economy and reduction of the emission of unwanted exhaust gas constituents all result. It has been found that the use of such an auxiliary induction system further increases the tolerance of the engine to variations in fuel air mixture because of the generated turbulance. In accordance with this invention, the efficiency is still further improved by positioning the inlet of the auxiliary induction passage at a point in the main induction system where it will intercept the path of fuel discharge from the carburetor idle circuit. This has been found to reduce the likelihood of fuel condensation and to improve the mixture distribution, particularly in engines having multiple cylinders supplied by a single carburetor barrel.

SUMMARY OF THE INVENTION

This invention is adapted to be embodied in an induction system for an internal combustion engine having a variable volume chamber in which combustion occurs, a charge forming device having a fuel discharge system including discharge port, and a main induction passage in communication with the charge forming device for delivering a charge to the variable volume chamber. In accordance with this invention, an auxiliary induction passage is provided that also is adapted to supply a charge to the variable volume chamber under at least some running conditions. The inlet to this auxiliary induction passage is positioned so that it will intercept the path of fuel discharged from the charge forming device discharge port.

DETAILED DESCRIPTION OF THE PREFERRED EMBODIMENT

Figure 1:
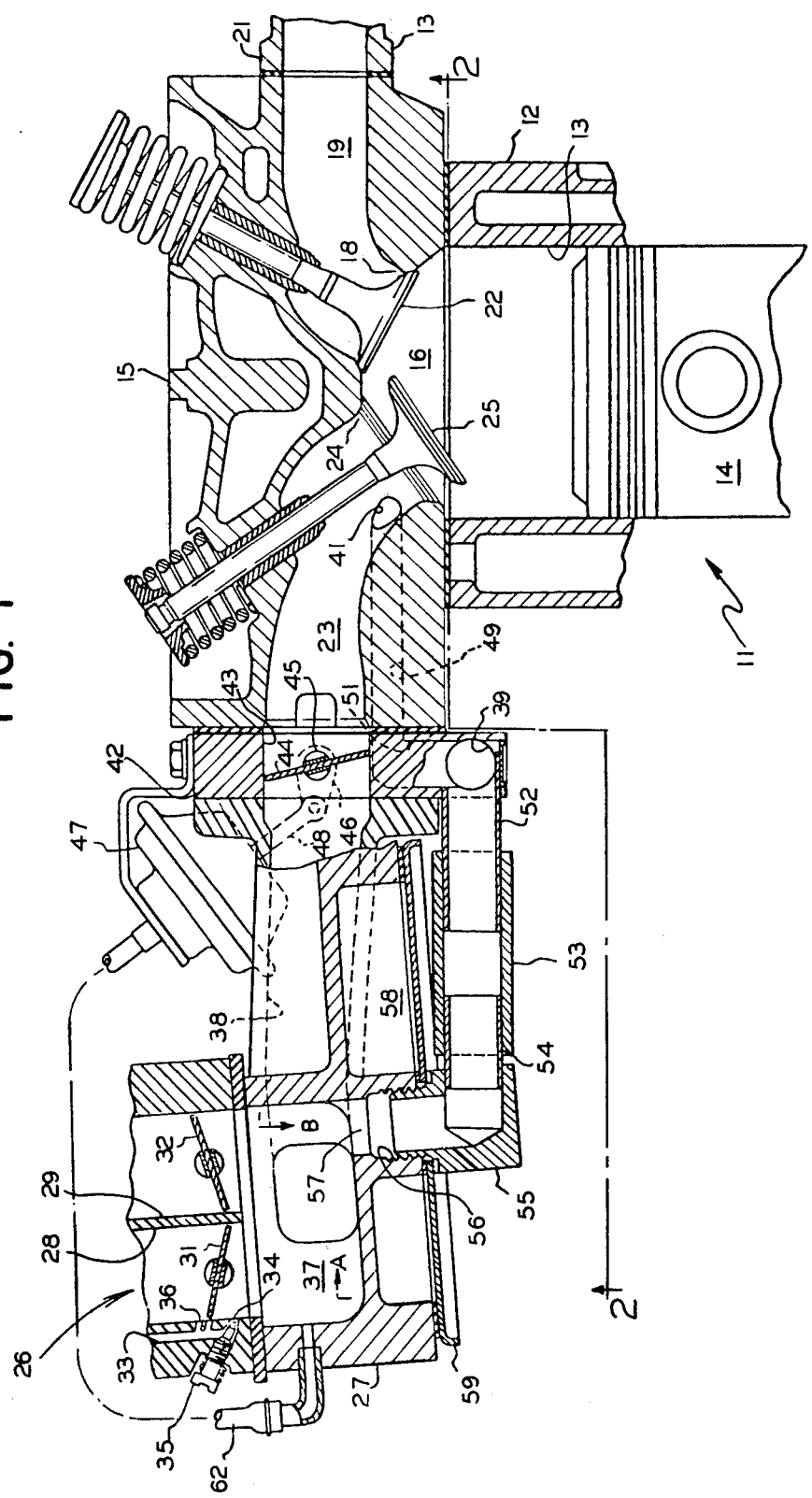
FIG. 1 is a cross-sectional view taken through a single cylinder of a multiple cylinder internal combustion engine embodying this invention and is taken generally along line 1—1 of FIG. 2.
Figure 2:
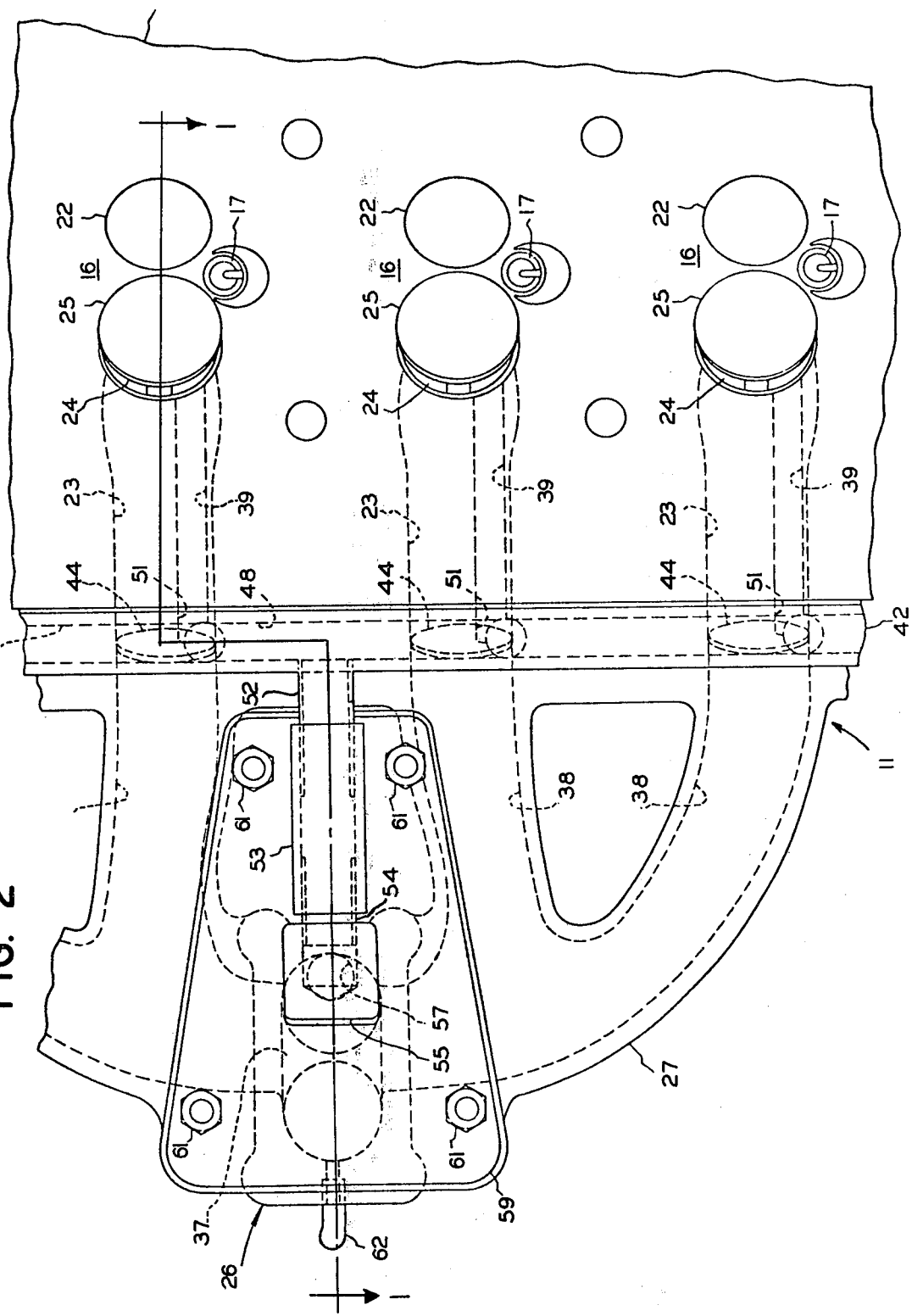
FIG. 2 is a bottom plane view of the engine taken generally in the direction of the line 2—2 of FIG. 1.

A multiple cylinder internal combustion engine embodying this invention is identified generally by the numeral 11. The engine 11 includes a cylinder block 12 having cylinder bores 13 in which pistons 14 are supported for reciprocation. The pistons 14 are coupled by means of connecting rods to a crank shaft in a known manner (not shown)

A cylinder head 15 is affixed to the cylinder block 12 and is formed with chambers 16 which cooperate with the pistons 14 and cylinder blocks 13 to form chambers of variable volume. Spark plugs 17 are positioned in each of the chambers 16 and are fired in a known manner to cause combustion to occur in the chambers 16. The burned combustion products are discharged through an exhaust port 18 into cylinder head exhaust passages 19 for eventual discharge through the exhaust system including an exhaust manifold 21. An exhaust valve 22 cooperates with each of the exhaust ports 18 so as to control the flow therethrough. The exhaust valves 22 are operated in any known manner.

Main intake passages 23 extend through the opposite side of the cylinder head 15 and terminate in intake ports 24 in communication with each of the chambers 16. The arrangement of the intake passages 23 and exhaust passages 19 provides a cross-flow arrangement. An intake valve 25 controls each intake port 26 and is operated in any known manner.

A charge is supplied to the chambers 16 from a carburetor, indicated generally by the reference numeral 26 through an intake manifold 27. The carburetor 26 is of the two barrel staged variety and includes a primary barrel 28 and a secondary barrel 29. Main fuel discharge systems, as are well known in this art, are provided for discharging a mixture to the barrels 28 and 29. Because this structure is conventional it has not been illustrated. Throttle valves 31 and 32 are provided in the barrels 28 and 29, respectively and are operated in a progressive or staged manner by any method known in this art.

As is also well known, the primary barrel 28 is provided with an idle fuel discharge circuit including a passage 33 which terminates in an idle discharge port 34 which is positioned on the downstream side of the throttle valve 31 when the throttle valve 31 is in its closed or idling position. An adjustable needle valve 35 is provided for adjusting the idle discharge. Transfer ports 36 are also provided from the idle circuit 33 adjacent the idle position of the throttle valve 31.

Both barrels 28 and 29 of the carburetor 25 discharge into a plenum 37 of the intake manifold 27. Individual runners 38 extend from the plenum 37 to each of the cylinder head main intake passages 23.

The structure thus far described is conventional and for this reason a more detailed explanation of it has not been given. With the relatively large cross-sectional area induction passage necessary to insure against loss of power at maximum load, the gas velocities at idle and low load are extremely slow. Furthermore, the supplying of a plurality of cylinders form a single carburetor barrel causes pulsations in the intake manifold which cause erratic variations in the mixture strength. As a result slow speed running is extremely inefficient both in the terms of fuel economy and in the terms of the emission of unwanted exhaust gas constituents. To overcome these defects the engine 11 is provided with a relatively small cross-sectional area auxiliary induction passage for introducing the charge to the chambers 16 at a high velocity so as to increase turbulance and improve combustion.

The auxiliary induction system includes auxiliary intake passages 39 formed in the cylinder head 15 adjacent to the main intake passages 23. The auxiliary induction passages 39 terminate in auxiliary intake ports 41 that are disposed adjacent the intake valves 25 so that they will discharge into the chambers 16 through the main intake ports 24. If desired, the auxiliary intake ports 41 may be disposed so that charge issuing from them enters the chamber 16 in a swirling pattern. In any event, the cross-sectional area of the auxiliary intake ports 41 is substantially less than that of the main intake passages 23 so that a given mass flow of charge passing through the ports 41 will enter the chamber 16 at a significantly greater velocity.

A valve block 42 is interposed between the intake manifold 27 and cylinder head 15. The valve block 42 is formed with passages 43 that communicate with the ends of the runners 39 and the inlet ends of the main cylinder head intake passages 23 so as to provide communication for the main induction system. It will be noted that the runners 38 extend in a generally downward direction and that the valve block passages 43 are disposed below the inlet to the runners 38.

Control valves 44 are supported in the valve block 42 for rotation upon a common shaft 45. A crank arm 46 is affixed to the shaft 45 and is operated by means of an actuator 47 and link 48. The method of operation of the valves 44 will be described below.

The valve block 42 is formed with a longitudinally extending passage 49 from which runners 51 extend to provide communication with each of the cylinder head auxiliary induction passages 39. A pipe 52 supplies the passage 49 and is connected by means of a flexible hose 53 to a pipe 54 extending from a fitting 55 that is threaded into a taped opening 56 formed in the lower portion of the manifold 27. The fitting 55 communicates with an auxiliary induction system inlet 57 that is disposed in a position so as to be intersected by the path of fuel discharge from the idle port 34 of the carburetor barrel 28. In this way it is assurred that a good and uniform mixture is delivered to the auxiliary induction system during idling.

A cavity 58 is positioned beneath the induction manifold plenum 37. The cavity 58 is enclosed by means of a plate 59 that is fixed to the manifold by means of nuts 61. Engine coolant is circulated through the cavity 58, which will be noted encircles the auxiliary induction system inlet 57, for heating the plenum 37 as well as the intake to the auxiliary induction system. This insures good fuel vaporization, particularly in the auxiliary induction system.

The actuator 47 is operated so as to close or substantially close the valves 44 during idle operation to effectively shunt all of the induction air and fuel flow through the auxiliary induction system. As the engine load increases, the control valves 44 are progressively open so that an increase in proportion of the mixture will be delivered to the chambers 16 through the main induction system. For this purpose, the actuator 47 is responsive to induction system pressure between the carburetor throttle valves 31 and 32 and the control valves 44. A conduit 62 interconnects this portion of the main induction system with the actuator 47. Positioned within the actuator 47 is a diaphragm and spring so as to provide an upper chamber which is in communication with induction system pressure through the conduit 62 and a lower chamber which experiences atmospheric pressure. The diaphragm is in turn connected to the link 48 for operating the throttle valves 44.

During idling there will be a fairly large vacuum (low absolute pressure) in the induction system between the throttle valves 31 and 32 and the control valves 44. This low pressure acting on the diaphragm of the actuator 47 will cause the link 48 to be drawn upwardly and effect closure of the control valves 44. Thus, the idle mixture will be delivered to the chamber 16 through the auxiliary induction system. As has been noted, the inlet 57 of this auxiliary induction system is positioned in the path of discharge of the fuel from the carburetor idle port 34. Thus, a good fuel air mixture will be introduced to the chambers 16 through the auxiliary induction system. The heating of the charge by the coolant in the cavity 58 will further improve running under this condition. The swirling turbulence created in the combustion chamber 16 under idle operation will promote flame propagation, improve economy, reduce exhaust emission and promote smooth running.

As the throttle valve 31 is progressively opened, fuel will be discharge additionally through the carburetor transition ports 36 and this fuel discharge is also directed through the auxiliary induction system inlet 57. Thus, off idle performance will also be improved.

Because the inlet 57 is also positioned above the control valves 44 any fuel which might tend to condense on the walls of the main induction passages will be directed away from the inlet 57 and mixture strength variations will be avoided. It has been found that with the manifold and carburetor arrangement as illustrated, the inlet 57 may be positioned anywhere within the rage identified by arrows A-B in FIG. 1 and the described results obtained.

As the load on the engine increases, the vacuum transmitted through the conduit 62 will decrease and the control valves 44 will be progressively opened. Thus, an increasing proportion of the mixture will be supplied to the chambers 16 through the main induction system.

It should be apparent that the use of the small cross sectional auxiliary induction passage and the specific positioning of its inlet to be intercepted by the idle and low speed fuel discharge from the carburetor significantly improves low speed performance. It is also to be understood that the foregoing description is that of a preferred embodiment of the invention and that various chages and modifications may be made without departing from the spirit and scope of the invention as defined by the apparent claims.

I claim:

1. An induction system for an internal combustion engine having a variable volume chamber in which combustion occurs, a charge forming device having a fuel discharge system including discharge port, and a main induction passage having a plenum for delivering charge therefrom to said variable volume chamber, the improvement comprising an auxiliary induction passage communicating at its downstream end with said variable volume chamber, said auxiliary induction passage having its inlet disposed in the lower wall of said plenum and in the path of fuel discharge from said charge forming device discharge port for delivering such fuel to said variable volume chamber through said auxiliary induction passage, and valve means for controlling the ratio of communication of the induction passages with the chamber so that a substantial portion of certain load requirements of the engine are served primarily through the auxiliary induction passage and a substantial portion of other load requirements are served primarily through the main induction passage.

2. An induction system as set forth in claim 1 wherein the discharge port supplies the fuel requirements through at least a portion of the load range served by the auxiliary induction passage.

3. An induction system as set forth in claim 2 wherein the valve means comprises a valve in the main induction passage, the auxiliary inducton passage inlet being positioned vertically above said valve for protecting against the passage of liquid fuel from the walls of the main induction passage into said inlet.

4. An induction system as set forth in claim 1 further including means for applying heat to the auxiliary induction passage inlet for promoting vaporization of the fuel flowing therethrough.

5. An induction system as set forth in claim 1 wherein the effective cross-sectional area of the auxiliary induction passage is substantially less than the effective cross-sectional area of the main induction passage so that a given mass flow of charge entering the chamber through the auxiliary induction passage will enter at a significantly greater velocity.

6. An induction system as set forth in claim 5 further including valve means for controlling the ratio of communication and the passages with the chamber and actuator means for operating said valve means in response to engine load so that substantially all of the idle and low speed charge requirements are supplied to the chamber through the auxiliary inductiion passage and substantially all of the high load requirements are supplied through the main induction passage.

7. An induction system as set forth in claim 6 wherein the discharge port comprises the idle discharge port of the charge forming device, said charge forming device further having a main fuel discharge.

8. An induction system as set forth in claim 7 wherein the valve means comprises a valve positioned in the main induction passage at a point below the auxiliary induction passage inlet.

9. An induction system as set forth in claim 8 further including means for heating the auxiliary induction passage inlet to promote fuel vaporization.

10. An induction system as set forth in claim 1, 5 or 6 wherein the engine has a plurality of chambers as defined therein and the charge forming device comprises at least one carburetor barrel serving all of the said chambers through a plurality of main and auxiliary induction passages as defined, the main induction passage including runners extending from the plenum to the chambers.

11. A multi-cylinder internal combustion engine having a plurality of cylinders, each having a combustion chamber and an intake valve, said engine comprising: at least one main intake passage common to at least two cylinders and comprising a collecting portion having an inlet, and at least two main branch intake passages branched off from said collecting portion, each of said main branch intake passages being connected to the respective combustion chamber via the corresponding intake valve; fuel supply means arranged in the inlet of said collecting portion; at least one auxiliary intake passage having an outlet, and an inlet which opens into said collecting portion; at least two auxiliary branch intake passages branched off from the outlet formed by a portion thereof extending generally parallel to the respective main branch passage and of said auxiliary intake passage, each of said auxiliary branch intake passages having an outlet which opens into the respective main branch passage at a place near the valve gap formed between the corresponding intake valve and a valve seat thereof when the intake valve is open, the outlet being directed through the valve gap and in the circumferential direction of the corresponding combustion chamber; primary valve means opened in accordance with increase in level of the load of an engine, and; secondary valve means arranged in said main branch intake passages and operatively connected to said primary valve means for opening said secondary valve means after the opening degree of said primary valve means is increased beyond a predetermined opening degree.

12. A multi-cylinder internal combustion engine as claimed in claim 11, wherein each of said auxilary branch intake passages has a cross-section which is smaller than that of said main branch intake passage.

13. A multi-cylinder internal combustion engine as claimed in claim 11, wherein said auxiliary intake passage has a cross-section which is smaller than that of said main branch intake passages.

14. A multi-cylinder internal combustion engine as claimed in claim 11, wherein said primary valve means comprises at least one primary throttle valve.

15. A multi-cylinder internal combustion engine as claimed in claim 11, wherein said secondary valve means comprises at least two secondary throttle valves, each being arranged in the respective main branch intake passages.

16. A multi-cylinder internal combustion engine as claimed in claim 15, wherein said secondary throttle valves are fixed onto a common throttle shaft.

17. A multi-cylinder internal combustion engine as claimed in claim 11, wherein said fuel supply means comprises at least one mass flow type carburetor.

* * * * *